United States Patent [19]

Wehrmüller et al.

[11] 4,179,645
[45] Dec. 18, 1979

[54] CIRCUIT FOR DRIVING AND BRAKING A SPEED-CONTROLLED DIRECT CURRENT MOTOR

[75] Inventors: Beat Wehrmüller, Hellbühl, Switzerland; Paul Wienenga, Mannheim, Fed. Rep. of Germany

[73] Assignee: BBC Brown, Boveri & Company Limited, Baden, Switzerland

[21] Appl. No.: 865,892

[22] Filed: Dec. 30, 1977

[30] Foreign Application Priority Data

Dec. 30, 1976 [DE] Fed. Rep. of Germany ....... 2659514

[51] Int. Cl.$^2$ ............................................. H02P 3/12
[52] U.S. Cl. .................................... 318/139; 318/269
[58] Field of Search .............. 318/139, 269, 258, 261, 318/273, 379, 380

[56] References Cited

U.S. PATENT DOCUMENTS

| | | | |
|---|---|---|---|
| 3,651,390 | 3/1972 | Vidal et al. | 318/269 |
| 3,697,845 | 10/1972 | Soffer et al. | 318/380 X |
| 3,872,367 | 3/1975 | Kuriyama et al. | 318/139 X |
| 3,903,465 | 9/1975 | Ibamoto et al. | 318/139 X |
| 4,025,836 | 5/1977 | Naito et al. | 318/139 X |

FOREIGN PATENT DOCUMENTS

2319898 10/1974 Fed. Rep. of Germany ........... 318/269

*Primary Examiner*—Gene Z. Rubinson
*Assistant Examiner*—W. E. Duncanson, Jr.
*Attorney, Agent, or Firm*—Burns, Doane, Swecker & Mathis

[57] ABSTRACT

A circuit for driving and braking a variable speed D.C. motor. A braking resistance has a terminal connected to the field winding of the motor. A diode is connected between this terminal and a quenching diode of the braking circuit to reduce the limiting effects of voltages produced across a reversing condenser in the braking circuit.

4 Claims, 3 Drawing Figures

CIRCUIT FOR DRIVING AND BRAKING A SPEED-CONTROLLED DIRECT CURRENT MOTOR

BACKGROUND OF THE INVENTION

The present invention relates to circuits for driving and braking a controllable D.C. motor.

German patent application No. P 25 57 280.0 discloses a circuit for driving and braking of a speed-controlled direct current motor, particularly for the drive of a vehicle such as a trolley car. The motor is energized during driving operations by a direct current source by means of a choking coil and a direct current regulator. Braking is provided by a braking resistance and a first diode connected in parallel with the field winding of the motor. Switches are provided to carry out the necessary connection of components to perform driving or braking operations. During the driving operation, the field winding, in series with a switch, is connected in shunt with the armature of the motor. During the braking operation, the braking resistance in series with the switch is connected in shunt with the armature of the motor. Between the quenching diode of the direct current regulator and one terminal of the resistance a second diode is provided, and during braking operations a third diode is connected between one terminal of the field winding and one terminal of the choking coil. This circuit provides a combination of regenerative and dynamic braking operations for a D.C. motor, depending on the absorbing capability of the power supply network. The regenerative braking operation requires a wide range of settings, especially at the lower end. However, in case of the circuit described, the limit of the lower range of settings is primarily controlled by the value of the voltage across the reversing condenser of the direct current regulator. There is the possibility that the available margin of settings within this range of operations will be reduced by an irregular, intermittent pulse rate. The resultant unstable operation of the regulator can lead to a temporary interruption of the current fed into a trolley network.

OBJECT AND BRIEF SUMMARY OF THE INVENTION

It is therefore an object of the present invention to increase the setting range at the lower end of the direct current regulator and thus avoid the interruption of the current flow during regenerative braking operation.

In accordance with this and other objects of the present invention, one terminal of the second diode is connected to the tap of the braking resistor which leads to the field winding. This connection of the second diode to one terminal of the field winding will overcome to a great degree the control of the lower setting limits of the circuit by the voltage arising across the reversing condenser. The lower setting limit of the regulator can be moved downward to such an extent that a skipping of the pulse rate, and an unstable operation caused thereby, will be eliminated. This provides a relief from the reversing current to a main controlling thyristor. Furthermore, an additional advantage of a reduction in current losses due to the reversal is achieved. In this manner, it is possible to avoid the shifting of the control mechanism between mixed braking operations, i.e., regenerative and fully dynamic braking operations.

The invention further provides an increase in the setting range of the direct current regulator, in order to solve another aspect of the problem associated with the previously described circuit. Another diode which blocks current in reverse direction relative to the main thyristor is connected in shunt with the main thyristor of the direct current regulator. The addition of this diode insures that the direct current regulator will operate independently of the load so that its setting range is thereby increased.

As a further feature of the invention, the cathode of the braking thyristor is connected to the common junction of the reversing choking coil and the reversing condenser of the direct current regulator. This feature makes it possible to eliminate the current change responsive choking coil of the previously described circuit, which is otherwise needed between the anode of the main thyristor of the direct current regulator and one terminal of the field winding.

Additional details and further advantageous developments of the present invention will become apparent from the embodiments of circuits shown in the drawings and explained below.

DESCRIPTION OF THE PREFERRED EMBODIMENTS

Figure 1:
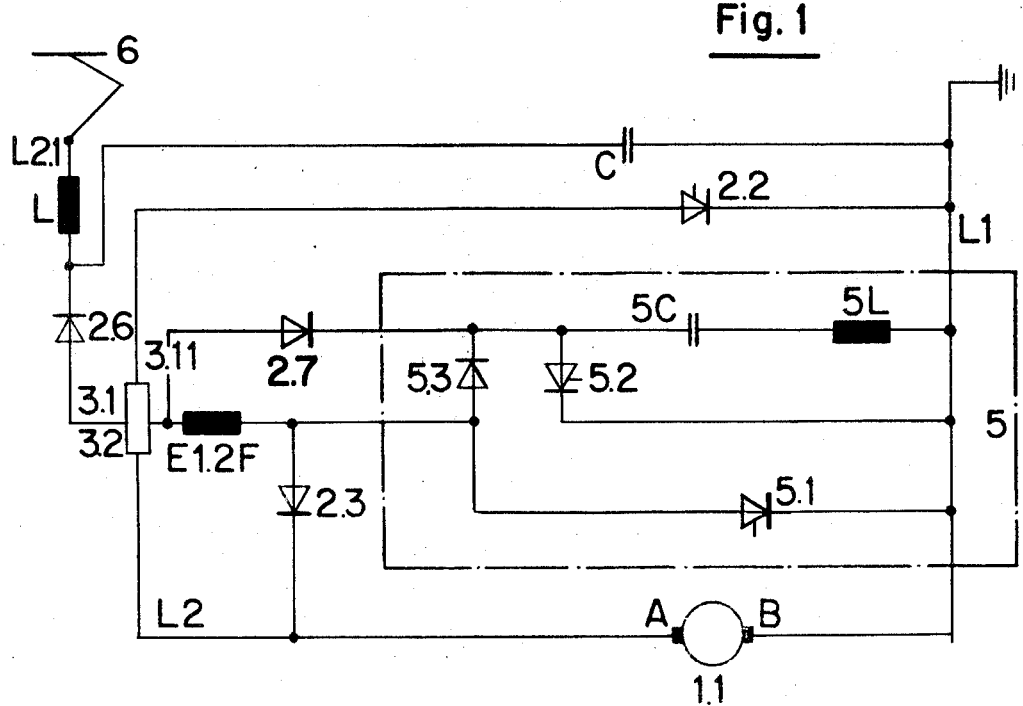
FIG. 1 is a shematic diagram of a first embodiment of a braking circuit in accordance with the present invention.
Figure 2:
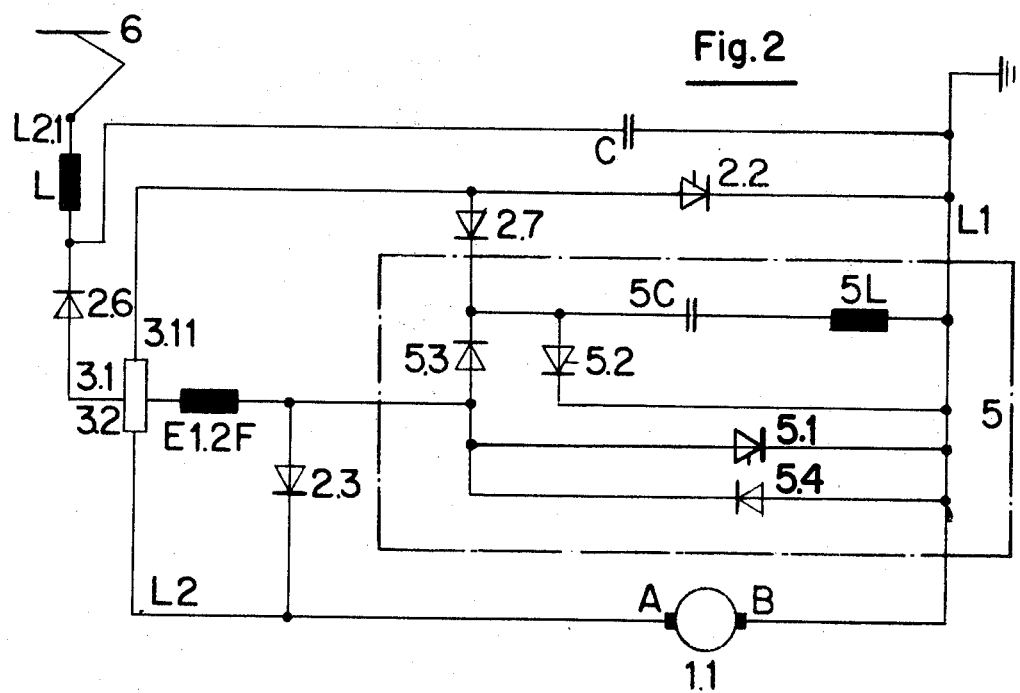
FIG. 2 is a shematic diagram of a second embodiment of a braking circuit in accordance with the present invention.
Figure 3:
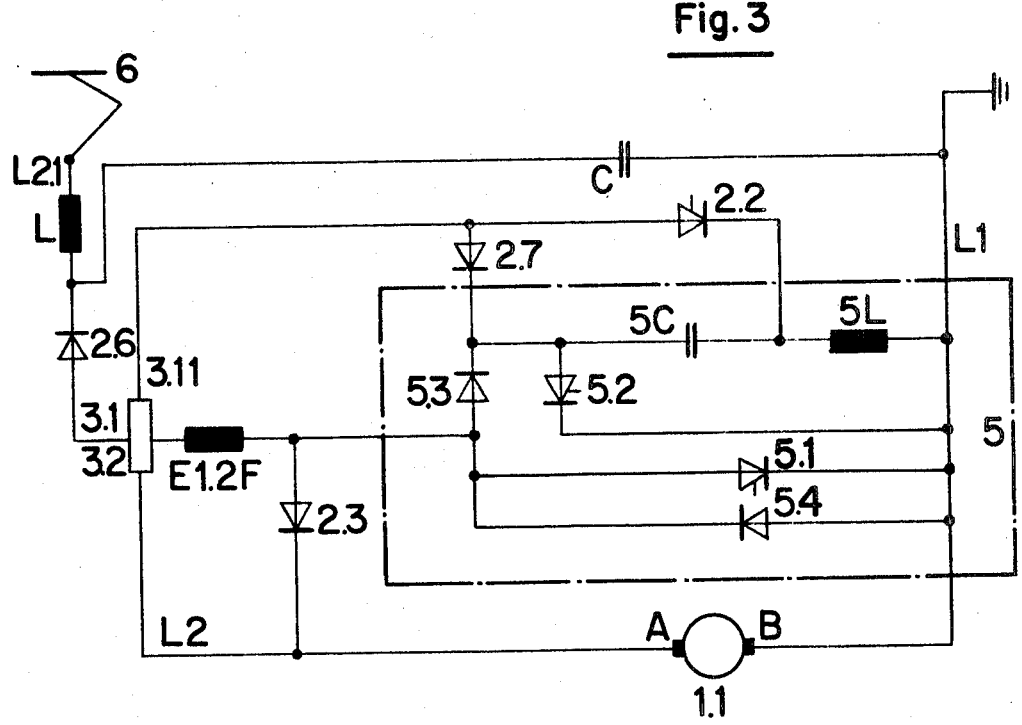
FIG. 3 is a schematic diagram of a third embodiment of a braking circuit in accordance with the present invention.

Referring to FIGS. 1 to 3 generally, a motor has an armature 1.1 with terminals A and B, and field winding 1.2 with terminals E and F. One terminal of an inductance L is connected to one input terminal of the motor. A connector L2.1 connects the other terminal of the inductor L to a current collector 6 such as those commonly found in connection with trolley cars. A condenser C is placed between the output terminal of the inductor L and ground potential L1.

A thyristor 2.2 in the braking circuit blocks current flow through the braking resistor 3 when non-conducting. A diode 2.3 is connected in parallel with the field winding 1.2 and blocks current flow in a direction from a terminal L2 on one side of the motor to the direct current regulator 5. The braking resistor 3 is provided with a tap 3.11 and its two resistance sections are denoted by 3.1 and 3.2. A diode 2.6 is connected between the tap 3.11 of the braking resistor 3 and the output terminal of the inductance L.

The direct current regulator 5 comprises a main thyristor 5.1, a reversing thyristor 5.2, a quenching diode 5.3, a reversing choking coil 5L and a reversing condenser 5C. The reversing condenser 5C and the reversing choking coil 5L form a series-connected unit, one end of which is connected to the cathode of the main thyristor 5.1 and its other end is connected to the junction of the cathode of the quenching diode 5.3 with the anode of the reversing thyristor 5.2. The anode of the main thyristor 5.1 is connected to the anode of the quenching diode 5.3. The cathode of the reversing thyristor 5.2 is connected with the cathode of the main thyristor 5.1 and ground.

In the circuit of FIG. 1, the anode terminal of a diode 2.7 is connected to the tap 3.11 of the braking resistor 3, the tap also being connected with the field winding 1.2. The cathode terminal of the diode 2.7 is connected to the cathode of the quenching diode 5.3 of the direct current regulator 5.

In the circuit of FIG. 2, the cathode of the diode 2.7 is connected to an output terminal of the direct current regulator 5, this terminal being connected to the cathode of the quenching diode 5.3. The anode of diode 2.7 is connected to the anode of thyristor 2.2 and to the resistor 3. An additional diode 5.4, blocking in reverse direction relative to the main thyristor 5.1, is connected in shunt with the main thyristor 5.1 of the direct current regulator 5.

In the circuit of FIG. 3, the cathode terminal of the braking thyristor 2.2 is connected to the common junction of the reversing choking coil 5L with the reversing condenser 5C of the direct current regulator.

The control circuits for the gates of the thyristors and the components needed for the drive circuitry are well-known and therefore not shown in the drawing for the sake of simplicity and clarity.

In operation, a pre-excitation circuit (not shown) energizes the field winding 1.2 of the direct current motor and induces a voltage in the armature 1.1. A measuring device, (not shown) measures the voltage $U_N$ across the input terminals of the braking circuit and determines whether or not the power supply network will be able to absorb energy. This will occur if the voltage falls below a predetermined value. The voltage induced in the armature of the motor will force a current through the terminal L2 and the resistor section 3.2. If the induced voltage is greater than the power network voltage across the trolley line, the current will continue to flow through the diode 2.6 and the choking coil L to the trolley line, and other vehicles can thus be supplied by this line. The current returns from the live rail by way of ground terminal L1 to the other terminal of the direct current motor. The inductor current will follow a path through the terminal L2, the resistor section 3.2, the field winding 1.2, the main thyristor 5.1 of the direct current regulator 5, the terminal L1 and back to the armature 1.1 of the direct current motor. When the thyristor 5.1 is blocked, a free-running induced current will flow through the diode 2.3, the terminal L2 and the resistor 3.2.

In a first phase of the direct current regulator operation, energy is transferred from the armature 1.1 to the power supply network. The three thyristors 5.1, 5.2 and 2.2 are blocked and a free-running current flows in the field winding 1.2 through the diode 2.3. The current in section 3.1 of the braking resistor equals zero and the power network current equals the armature current. In the second phase, the main thyristor 5.1 is fired. From the armature 1.1 there will be an additional flow of current through the resistor section 3.2 into the field winding 1.2, thereby exciting the field, which returns to the armature 1.1 through the main thyristor 5.1. In the next phase the quenching thyristor 5.2 fires, the quenching condenser 5C discharges and reverses polarity, rendering the diodes 5.3 and 2.7 conductive. In the next phase the current through the quenching diode 5.3 is reaching the value of the armature current. The charge of the quenching condenser 5C is again reversed and the main thyristor 5.1 is quenched. In the next phase the sum of the voltage across the field winding and the voltage across the quenching condenser 5C reaches a value that is greater than the power network voltage. The diode 2.6 becomes conductive and a regenerative braking current will flow again and increase until it reaches the magnitude of the armature current. The diode 2.7 then goes into the blocking state.

As stated previously, the circuit disclosed in the German patent application caused, under certain circumstances at the lower range of speed control, a shifting of the circuit between mixed braking (regenerative/dynamic braking) and full dynamic braking which was due to the fact that the braking thyristor could not be quenched if the pulses were blocked. This resulted in torque surges which influenced adversely the driving response of the vehicle. The connection of the diode 2.7 between the field winding 1.2 and braking resistor tap 3.11 has the effect that the voltage across the reversing condenser 5C cannot influence the field of the motor as a driving voltage. In this manner, the shifting of the circuit between mixed braking and full dynamic braking, and thus the interruption of the regenerative braking current, is eliminated.

In the circuits illustrated in FIGS. 2 and 3, an additional diode 5.4 is connected in parallel with the main thyristor. This diode acts as a reversing or commutating diode. This diode makes it possible for the quenching condenser 5C to return to its initial voltage by way of the reversing choking coil 5L, the diode 5.3 and the diode 5.4. The frequency of the braking circuit will thus become practically free of the influence by the load current. This applies as well to the minimum initial voltage which can be set independently of the load current. This results in a broader range of control during braking operations.

The present invention may be embodied in other specific forms without departing from the spirit or essential characteristics thereof. The presently disclosed exemplary embodiment is therefore to be considered in all respects as illustrative and not restrictive, the scope of the invention being indicated by the appended claims rather than by the foregoing description, and all changes which come within the meaning and range of equivalency of the claims are therefore intended to be embraced.

What is claimed is:

1. A circuit for the driving and braking of a speed-controlled direct current motor which is energized during driving operations by a direct current source by way of a choking coil and a direct current regulator that includes a quenching diode, especially for the drive of a vehicle, including a braking resistance and a first diode, connected in parallel with a field winding of the motor, a plurality of switching means to carry out the regrouping of the components from a driving to a braking operation, the field winding being in series with one of the switching means and during the driving operation being connected in shunt with the armature of the motor, the braking resistance being in series with one of the switching means and during the braking operation being connected in shunt with the armature of the motor, a second diode connected between the quenching diode of the direct current regulator and the braking resistance, a third diode connected during braking operations between one terminal of the field winding and one terminal of the choking coil, one terminal of the second diode being connected to the braking resistance at the connection of the braking resistor to the field winding.

2. A circuit for the driving and braking of a motor as defined in claim 1, wherein the direct current regulator includes a reversing choking coil connected in series to a reversing capacitor and wherein one of the switching means is a braking thyristor, the cathode terminal of the braking thyristor being connected to junction of the reversing choking coil and the reversing condenser of the direct current regulator.

3. A circuit for the driving and braking of a speed-controlled direct current motor which is energized during driving operations by a direct current source by way of a choking coil and a direct current regulator that includes a quenching diode, especially for the drive of a vehicle, the circuit including a braking resistance and a first diode, connected in parallel with a field winding of the motor, a plurality of switching means to carry out the regrouping of the circuit components from a driving to a braking operation, the field winding being in series with one of the switching means and during the driving operation being connected in shunt with the armature of the motor, the braking resistance being in series with one of the switching means and during the braking operation being connected in shunt with the armature of the motor, a second diode connected between the quenching diode of the direct current regulator and the braking resistance, a third diode connected during braking operation between one terminal of the field winding and one terminal of the choking coil, an additional diode connected in shunt with and in reverse polarity to the one of the switching means in series with the field winding.

4. A circuit for the driving and braking of a motor as defined in claim 3 wherein the direct current regulator includes a reversing choking coil connected in series to a reversing capacitor and wherein one of the switching means is a braking thyristor, the cathode terminal of the braking thyristor being connected to junction of the reversing choking coil and the reversing condenser of the direct current regulator.

* * * * *